(12) United States Patent
Sharp et al.

(10) Patent No.: US 8,413,608 B2
(45) Date of Patent: Apr. 9, 2013

(54) APPARATUS AND METHOD FOR HANDLING ANIMAL WASTE

(76) Inventors: Randall Sharp, Murrieta, CA (US); Arthur Dobreski, Pine Mountain Club, CA (US)

( * ) Notice: Subject to any disclaimer, the term of this patent is extended or adjusted under 35 U.S.C. 154(b) by 168 days.

(21) Appl. No.: 12/932,752

(22) Filed: Mar. 4, 2011

(65) Prior Publication Data

US 2011/0214614 A1    Sep. 8, 2011

Related U.S. Application Data

(60) Provisional application No. 61/310,873, filed on Mar. 5, 2010.

(51) Int. Cl.
*A01K 29/00* (2006.01)
(52) U.S. Cl.
USPC .......................................................... 119/166
(58) Field of Classification Search .................. 119/161, 119/165, 166
See application file for complete search history.

(56) References Cited

U.S. PATENT DOCUMENTS

| | | | |
|---|---|---|---|
| 1,268,450 A | 6/1918 | Gauntt | |
| 4,120,264 A | 10/1978 | Carter | |
| 4,190,525 A | 2/1980 | Menzel | |
| 4,522,150 A | 6/1985 | Gershman | |
| 4,846,104 A | 7/1989 | Pierson, Jr. | |
| 5,048,464 A | 9/1991 | Shirley | |
| 5,107,797 A | 4/1992 | LaRoche | |
| 5,167,204 A | 12/1992 | Nussle | |
| 5,507,252 A | 4/1996 | Ebert | |
| 5,509,379 A | 4/1996 | Hoeschen | |
| 5,551,375 A | 9/1996 | Flores | |
| 5,622,140 A | 4/1997 | McIlnay-Moe | |
| 5,662,066 A | 9/1997 | Reitz | |
| 5,752,465 A | 5/1998 | Page | |
| 5,785,000 A | 7/1998 | Barbary | |
| 6,126,015 A | 10/2000 | Haymaker | |
| 6,286,457 B1 | 9/2001 | Sugahara | |
| 6,286,459 B1 | 9/2001 | Parr | |
| 6,463,881 B1 | 10/2002 | Reitz | |
| 7,013,835 B2 | 3/2006 | Brokaski | |
| 7,137,355 B1 | 11/2006 | Wan | |
| 7,278,372 B2 | 10/2007 | Colsky | |
| 7,487,742 B2 | 2/2009 | Waters | |
| 2005/0235920 A1* | 10/2005 | Brokaski | 119/166 |
| 2007/0227457 A1* | 10/2007 | Waters | 119/166 |
| 2008/0017123 A1 | 1/2008 | Chin | |
| 2009/0107408 A1* | 4/2009 | Waters | 119/166 |

* cited by examiner

*Primary Examiner* — Monica Williams
(74) *Attorney, Agent, or Firm* — Ryndak & Suri LLP

(57) ABSTRACT

An animal waste handling apparatus having a cylindrical housing with an opening to allow an animal to enter to relieve itself in litter held in the interior volume of the housing. The apparatus has a sifting drawer that is removably mounted in the interior volume of the housing and is carried for rotational movement when the housing is rotated about its axis. The sifting drawer includes an open top, an unobstructed interior volume and a filter member spaced from the open top. During a rotational sifting cycle, the sifting drawer enters the litter to capture the litter for filtering to separate animal waste from the litter. The filtered litter remains in the interior volume of the housing and filtered out waste is retained in the sifting drawer. The sifting drawer is removed along a direction that is parallel to the axis of the housing about which the housing is rotated.

20 Claims, 6 Drawing Sheets

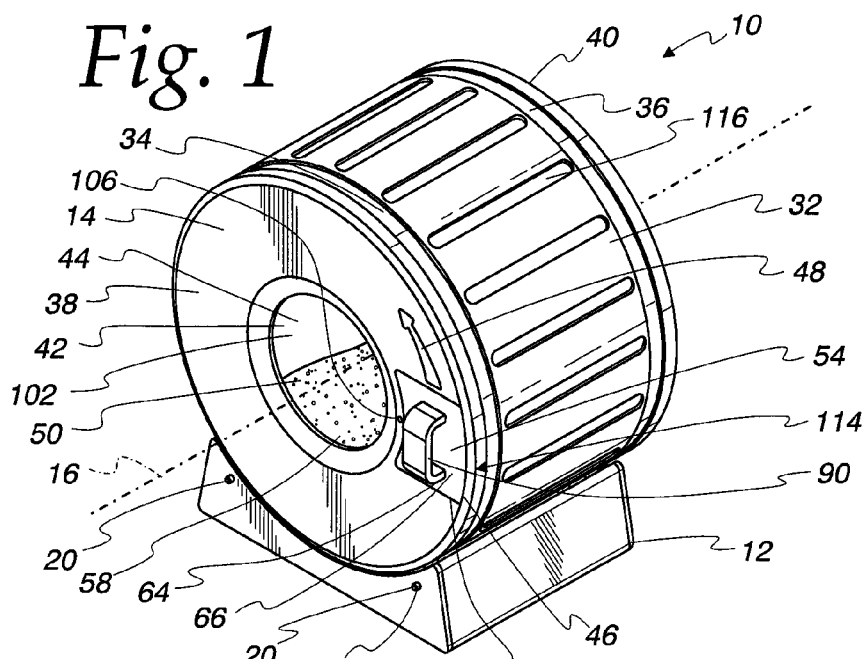
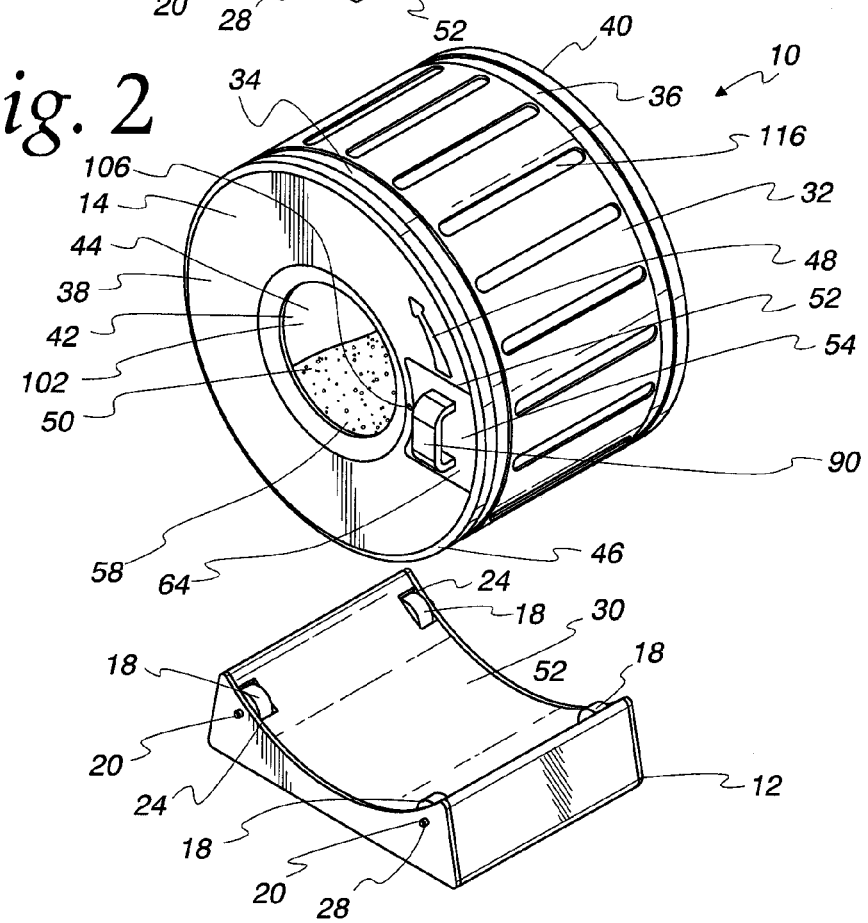

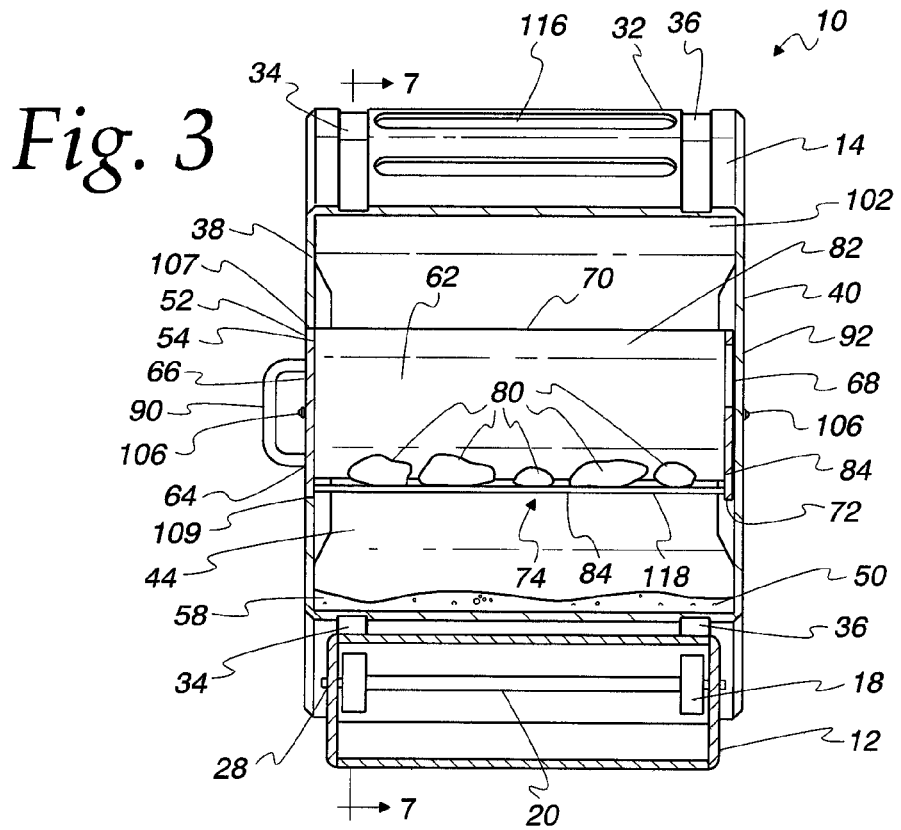
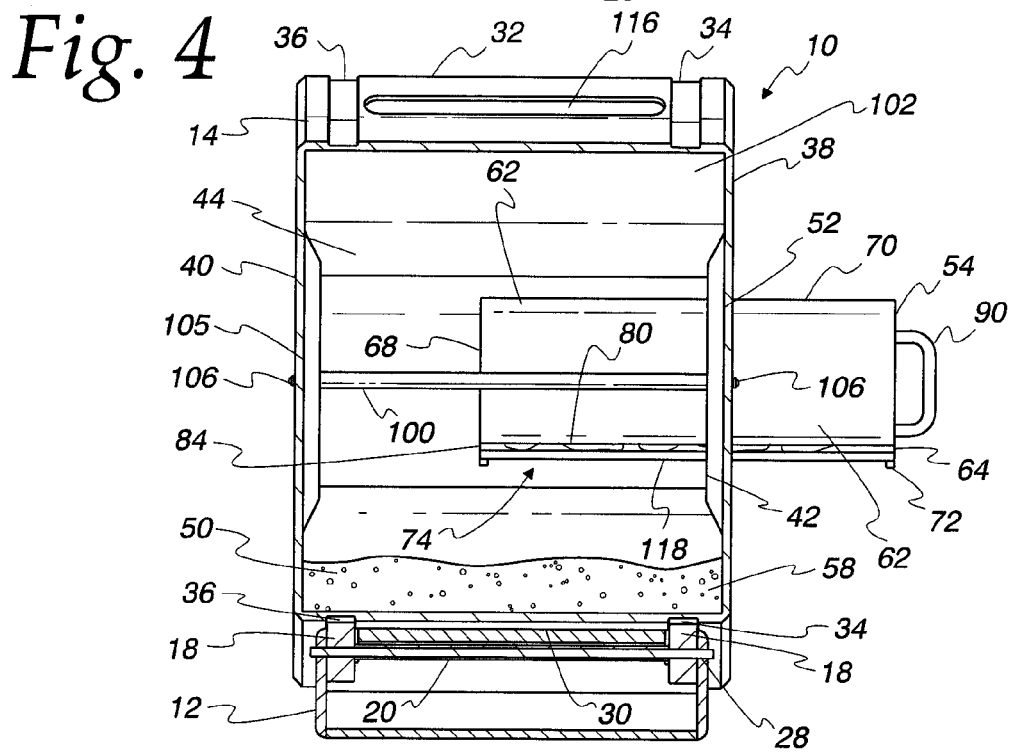

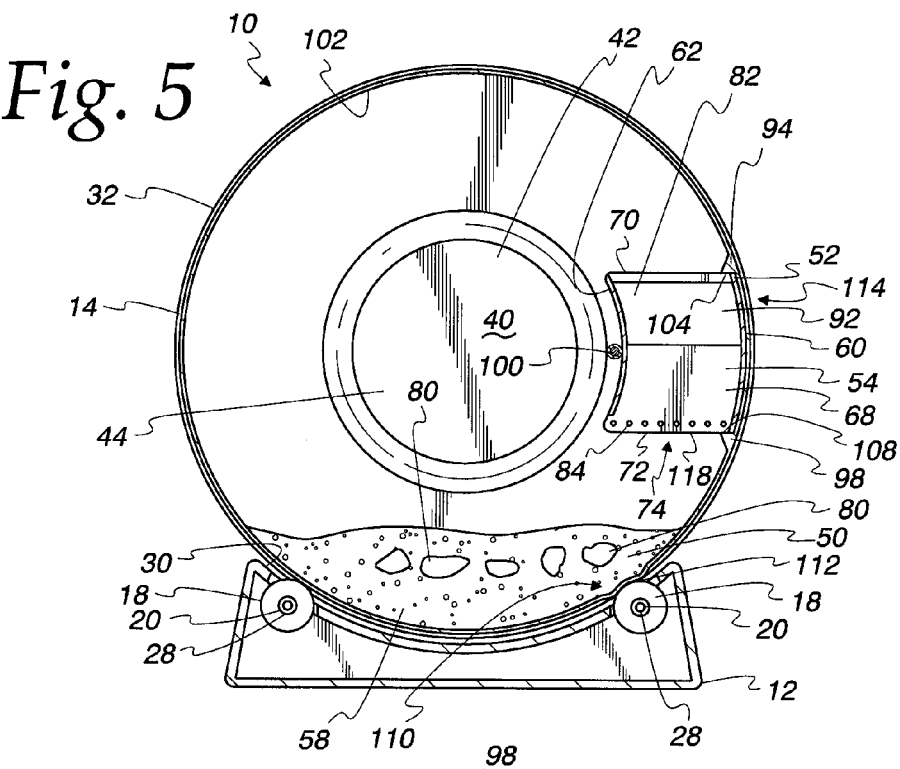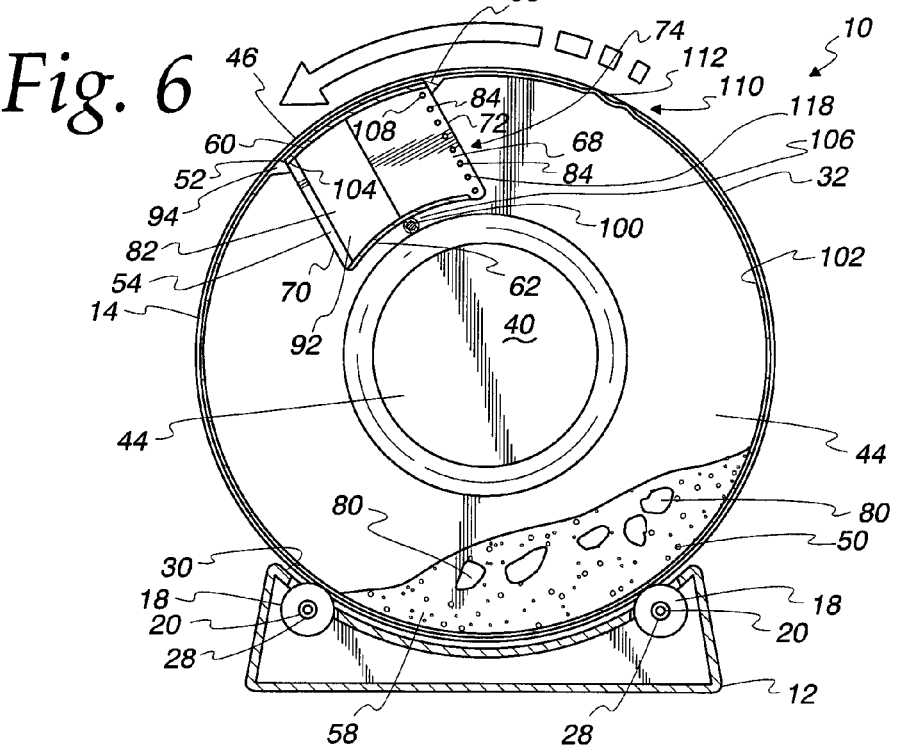

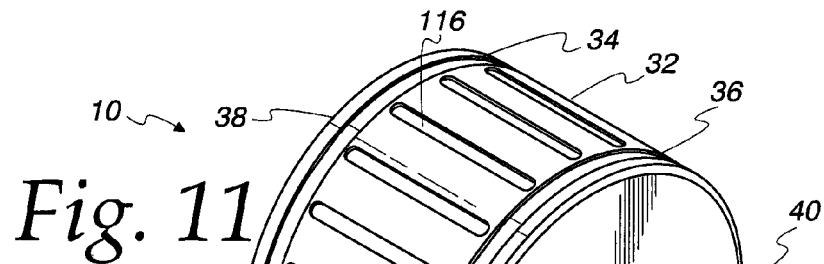
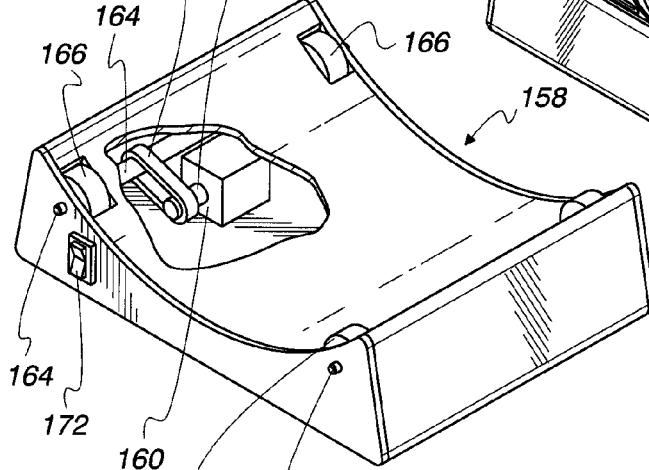
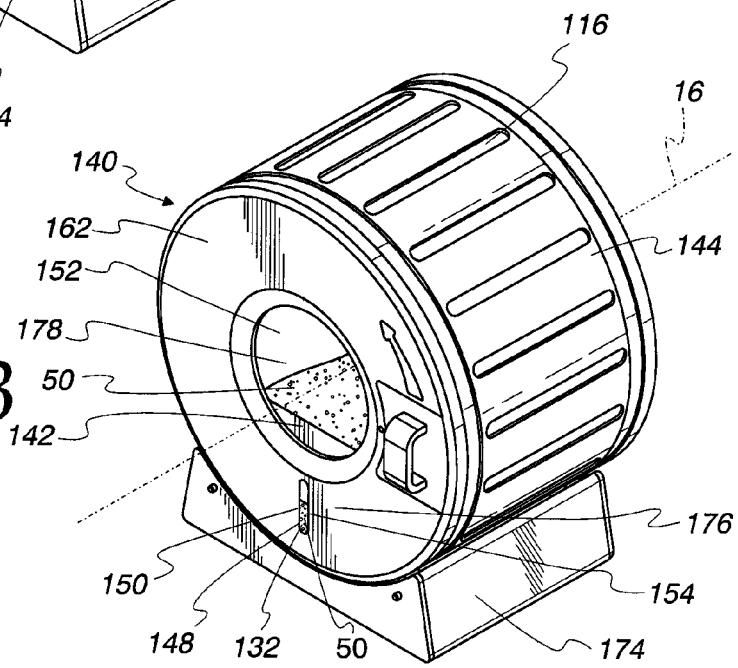

APPARATUS AND METHOD FOR HANDLING ANIMAL WASTE

CROSS REFERENCE TO RELATED APPLICATION

This application claims the benefit under 35 U.S.C. §119 (e) of U.S. Provisional Patent Application No. 61/310,873, filed Mar.5, 2010, the entire disclosure of which is hereby expressly incorporated by reference.

FIELD OF THE INVENTION

This invention relates to an apparatus and method for handling animal waste.

BACKGROUND OF THE INVENTION

Pet owners are well aware of the frequently required and unpleasant chore related to cleaning pet litter boxes. Many pet litter boxes require manually scooping waste to separate waste from the reusable litter. This can be a messy, time-consuming and dreaded task for pet owners.

A need exists for an improved pet waste handling apparatus that is easy to use and does not create a mess. A need also exists for an efficient pet waste handling device that can quickly and simply accomplish the task of separating pet waste from the litter so that the cleaned litter can continue to be used.

SUMMARY OF THE INVENTION

In accordance with the present invention an apparatus for handling animal waste is provided. The apparatus comprises a cylindrical housing mounted for rotation and has two generally opposed ends and a generally circular side and an interior volume for holding litter. The cylindrical housing has an opening generally centrally located in one end of the cylindrical housing for allowing an animal to enter the interior space of the cylindrical housing and relieve itself inside the housing. The housing includes a second opening in one of the ends and located proximate the cylindrical side for insertion and removal of a sifting drawer into the interior volume of the cylindrical housing. The apparatus includes a base for supporting the housing and allowing the housing to be rotated about an axis of the housing. The apparatus also includes a sifting drawer for sifting through the litter held in the apparatus to separate the litter from animal waste deposited in the litter and to retain the animal waste in the sifting drawer. The sifting drawer is removably mounted adjacent an internal side of the cylindrical housing and has a volume contained within the interior of the housing so that the rotation of the housing about its longitudinal axis carries along the sifting drawer for sifting through a mixture of litter and animal waste. The sifting drawer has a first opening and second opening spaced from the first opening. The second opening has a sifting member disposed therein. The housing is rotatable along its side in a first direction so that the first opening is the lead opening to be passed through the mixture to be sifted to allow the mixture to enter the sifting drawer and move to the second opening as the housing rotation continues in the first direction. The sifting member allows the litter in the mixture to pass through the sifting member and exit the drawer and be contained in the housing while retaining solid animal waste of a particulate size larger than that which can pass through the sifting member in the sifting drawer. The apparatus includes at least one guide member within the interior of the housing for guiding and supporting the sifting drawer to allow the sifting drawer to be removably mounted in the interior of the housing and removed for discarding retained solid animal waste from the sifting drawer. The sifting drawer is inserted into and removed from the mounted position through the second opening in the housing by movement of the sifting drawer along a direction that is substantially parallel to the longitudinal axis around which the housing is rotated.

In accordance with another aspect of the present invention an apparatus for handling animal waste is provided. The apparatus comprises a cylindrical housing mounted for rotation and having two generally opposed ends and a generally circular side and an interior volume for holding litter. The cylindrical housing has an opening generally centrally located in one end of the cylindrical housing for allowing an animal to enter the interior space of the cylindrical housing and relieve itself inside the housing. The housing has a second opening in one of the ends and located proximate the cylindrical side for insertion and removal of a sifting drawer into the interior volume of the cylindrical housing. The apparatus includes a base for supporting the housing and allowing the housing to be rotated about an axis of the housing. The apparatus also includes a sifting drawer for sifting through the litter held in the apparatus to separate the litter from animal waste deposited in the litter and to retain the animal waste in the sifting drawer. The sifting drawer is removably mounted adjacent an internal side of the cylindrical housing and having a volume contained within the interior of the housing so that the rotation of the housing about its longitudinal axis carries along the sifting drawer for sifting through a mixture of litter and animal waste. The sifting drawer has a first opening and second opening spaced from the first opening. The sifting drawer has an unobstructed internal volume, the unobstructed volume allowing an unobstructed passage of the mixture from the first opening of the sifting drawer to the second opening of the sifting drawer. The second opening has a sifting member disposed therein, the housing being rotatable along its side in a first direction so that the first opening is the lead opening to be passed through the mixture to be sifted to allow the mixture to enter the sifting drawer and move to the second opening as the housing rotation continues in the first direction. The sifting member allows the litter in the mixture to pass through the sifting member and exit the drawer and be contained in the housing while retaining solid animal waste of a particulate size larger than that which can pass through the sifting member in the sifting drawer. At least one guide member is provided within the interior of the housing for guiding and supporting the sifting drawer to allow the sifting drawer to be removably mounted in the interior of the housing and removed for discarding retained solid animal waste from the sifting drawer.

In accordance with another aspect of the invention an apparatus for handling animal waste is provided that is affordable, compact, has a low footprint and can be operated in a confined area.

In accordance with a further aspect of the invention an apparatus for handling animal waste is provided that is quick and simple to use to separate pet waste from litter to conserve the filtered litter for continued use and to accomplish the foregoing while avoiding the mess and other unpleasantness typically associated with handling pet animal waste.

In accordance with another aspect of the present invention a method of handling animal waste is provided. The method includes providing a rotatable cylindrical housing having a central axis, and an interior volume for holding litter and for allowing a pet to enter and relieve itself in the litter. An ingress and egress opening in the housing for allowing a pet to enter the interior volume of the housing is also provided. A sifting drawer is provided for sifting a mixture of the litter and pet waste interspersed therein, to separate the pet waste from the litter. The sifting drawer includes an interior volume, a substantially open top side and opposite bottom side including a filter member. The method includes removably mounting the sifting drawer in a position within the interior volume of the housing so that the rotation of the housing carries the sifting drawer and so that when the housing is rotated in a first direction the open top side is the leading side of the sifting drawer to pass into and out of the litter. The method includes rotating the housing and the sifting drawer in the first direction about the central axis of the cylindrical housing to cause the mixture to enter the interior volume of the sifting drawer through the open top side; and thereafter continuing the rotation of the housing in the first direction to cause the mixture captured in the interior volume of the sifting drawer to be moved towards the filter member in the bottom side of the sifting drawer. The method further includes filtering the captured mixture to separate the litter from the pet waste contained in the mixture by rotating the housing in the first direction to cause the captured litter to move to the filter, whereat the filter member allows litter to pass through the filter member and out the bottom of the sifting drawer and the filter member retains pet waste within the interior volume of the sifting drawer. Thereafter, the sifting drawer is removed from the housing by withdrawing the sifting drawer along a direction that is parallel to the axis about which the housing is rotated. Thereafter, waste retained in the interior of the sifting drawer is discarded.

Other advantages and features of the invention will become apparent from the following description and from reference to the drawings.

BRIEF DESCRIPTION OF THE DRAWINGS

FIG. 1 is a perspective view illustrating an animal waste handling apparatus in accordance with the present invention;

FIG. 2 is an exploded perspective view of the animal waste handling apparatus showing the cylindrical housing and the base of FIG. 1;

FIG. 3 is a side sectional view along the line 3-3 of FIG. 8 showing the sifting drawer mounted in the interior volume of the housing of the animal waste handling apparatus;

FIG. 4 is a side sectional view along the line 4-4 of FIG. 8 showing the sifting drawer partially moved out from the interior volume of the housing of the animal waste handling apparatus;

FIG. 5 is a side sectional view of the animal waste handling apparatus as shown in FIG. 7 with the housing rotated about 250 degrees clockwise from the position shown in FIG. 7;

FIG. 6 is a side sectional view of the animal waste handling apparatus as shown in FIG. 7 with the housing rotated about 125 degrees clockwise from the position shown in FIG. 7;

FIG. 11 is a perspective view illustrating the rear of the housing of the animal waste handling apparatus in accordance with the present invention;

FIG. 12 is a fragmentary perspective view illustrating a second embodiment of the base of the animal waste handling apparatus wherein the base includes a motor;

FIG. 13 is a perspective view of another embodiment of the present invention that includes a window for gauging the height of litter in the apparatus.

DETAILED DESCRIPTION

Figure 7:
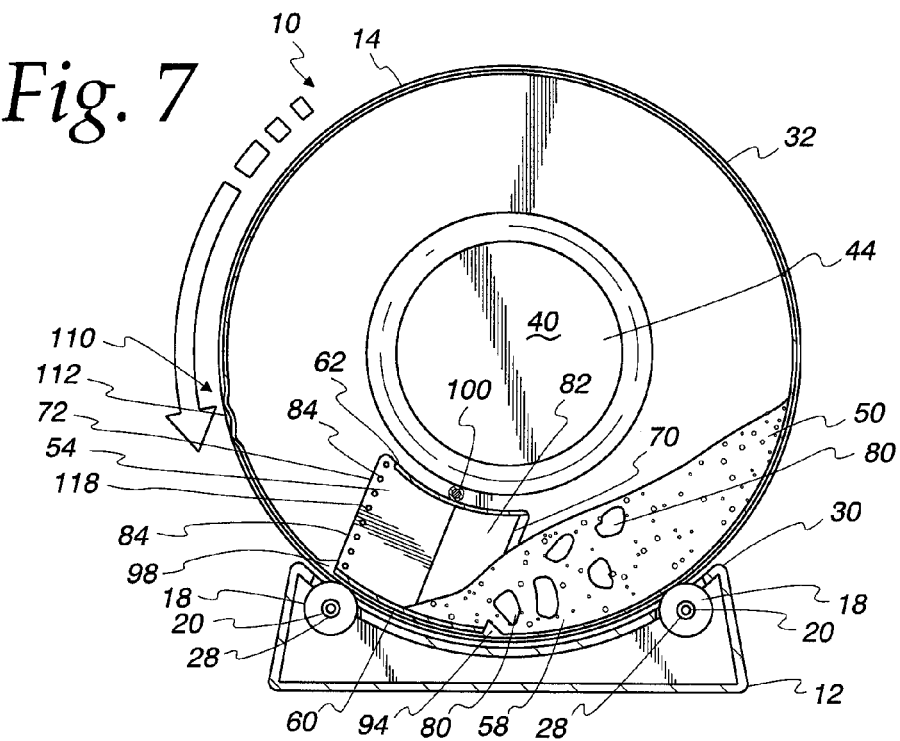
FIG. 7 is a side sectional view along line 7-7 of FIG. 3 showing the animal waste handling apparatus during a sifting cycle wherein the housing has been rotated counterclockwise from the positions shown in FIGS. 5 and 6 and showing the sifting drawer having entered the litter to be sifted.

While this invention is susceptible of embodiment in many different forms, there are shown in the drawings and described in detail herein, several specific embodiments with the understanding that the present disclosure is to be considered as exemplifications of the principles of the invention and is not intended to limit the invention to the embodiments illustrated.

Referring to the figures generally, FIGS. 1 and 2 in particular, an apparatus 10 for handling animal waste is illustrated. Apparatus 10 includes a base 12 for supporting a generally cylindrical housing 14 for rotational movement about its central longitudinal axis 16. Typically, cylindrical housing 14 will have a circular cross-section, longitudinal axis 16, cylindrical side 32, front end 38 and rear end 40. Base 12 includes wheels 18 that are mounted to a pair of axles 20. Each of axles 20 is mounted into a pair of holes 28 formed in base 12. Holes 28 are located so that when axles 20 are mounted to base 12, wheels 18 extend through openings 24 in the upper surface 30 of base 12. Housing 14 has a generally cylindrical outer side 32 that rests on wheels 18 for rotational movement. Upper surface 30 of base 12 has an arc shaped profile to allow the unobstructed rotation of housing 14. The surface of outer side 32 of housing 14 optionally may include grooves 34, 36 that circumferentially extend around outer side 32 of housing 14. Housing 14 is placed on base 12 with one pair of wheels 18 aligned in each of grooves 34, 36. Such arrangement maintains housing 14 in alignment on base 12 when housing 14 is rotated about its longitudinal axis 16 to conduct a litter sifting cycle. Housing 14 includes the front end 38 and the opposite rear end 40. Front end 38 has a centrally located opening 42 to provide an animal ingress and egress into an interior volume 44 of housing 14. Interior volume 44 and centrally located opening 42 are sufficient in size to accommodate animals, for example a pet such as a cat, to enter through opening 42 and into interior volume 44 to relieve itself. Rear end 40 typically will be closed. If desired, rear end 40 may optionally include an ingress and egress opening similar to opening 42 appearing in front end 38 of housing 14. Housing 14 may also include indicia 48. Indicia 48 indicates the normal direction that the pet owner rotates housing 14 when conducting a litter sifting cycle for litter 50 that has been soiled. As illustrated in the figures, indicia 48 direct the pet owner to a counterclockwise rotation for conducting a litter sifting cycle. The invention as described is configured for counterclockwise rotation when viewed from the front of housing 14; however it is understood that apparatus 10 could be alternatively configured to conduct the litter sifting cycle by rotating in the opposite clockwise direction.

Housing 14 also includes an opening 52 for removably mounting sifting drawer 54. As discussed later in greater detail, opening 52, like opening 42, is preferably located in the front end 38 of housing 14. Opening 52 is located proximate to or adjacent to the periphery 46 of front end 38 and adjacent to, or proximate to, the outer side 32 of housing 14 so that a mounted sifting drawer 54 will be rotated to pass through litter 50 that is located in the bottom 58 of interior volume 44. As discussed later in detail, such location for opening 52 is also additionally advantageous when litter 50 needs to be dumped and replaced with a fresh batch of litter. When sifting drawer 54 is removed from opening 52, opening 52 provides a very convenient location for dumping litter 50 from housing 14.

Figure 9:
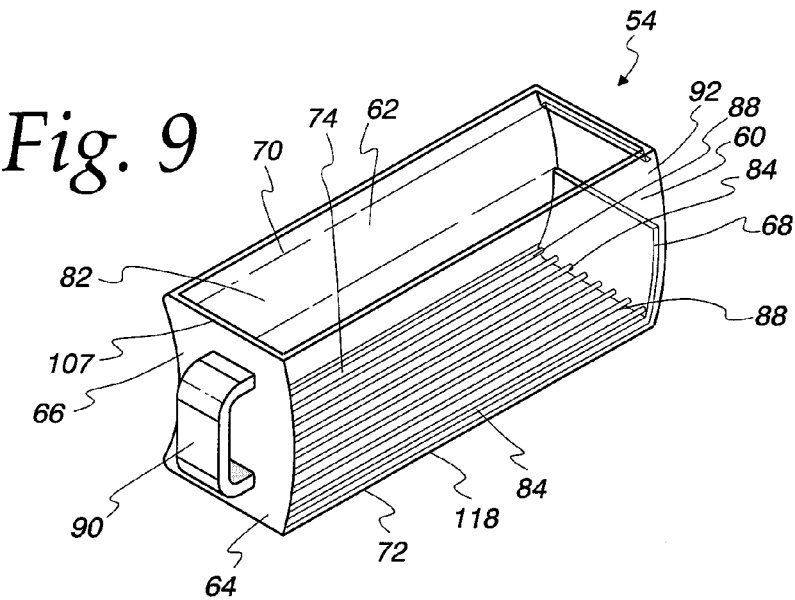
FIG. 9 is a perspective view illustrating the sifting drawer in accordance with the present invention.

Sifting drawer 54 includes an outer sidewall 60, an inner sidewall 62, a front end 64 and a back end 68. Sifting drawer 54 has a substantially open top side 70 and a bottom side 72 that includes a filter member 74. Filter member 74 may be formed as a screen, rods or any such filter that has a pore size that allows suitable filtering of litter 50 that has been soiled. As discussed later in detail, during filtering, filter member 74 is rotated through litter 50 that is soiled, i.e. a mixture of litter 50 and animal waste 80 interspersed in litter 50. Filtering is conducted to separate animal waste 80 and litter 50 so that the separated filtered litter 50 can be reused. When a mixture of waste 80 and litter 50 is sifted, filter member 74 allows filtered litter 50 to pass through filter member 74 and out bottom side 72 of sifting drawer 54. At the same time, most, if not all, of animal waste 80 is retained within the interior 82 of sifting drawer 54. As best seen in FIG. 9, exemplary filter member 74 includes a plurality of parallel rods 84 extending between front end 64 and back end 68 of sifting drawer 54. The spaces between rods 84 provide a plurality of openings 88 that are large enough to allow the passage therethrough of filtered litter 50 and small enough to prevent passage of waste 80. As an example, each of openings 88 has a width of approximately 0.30 inches. Rods 84, for example, have a diameter of approximately 0.10 inches. If filter member 74 is provided in the form of a screen, each of the openings of the screen preferably do not exceed about 0.03 inches. Exemplary sifting drawer 54 includes a handle 90, such as handle 90 that extends from a front surface 66 of front end 64. Back end 68 optionally may also include an opening 92 through which retained animal waste 80 may be dumped after sifting drawer 54 has been removed from housing 14. Typically, waste 80 is discarded by tilting sifting drawer 54 downwardly and dumping waste 80 directly into a garbage receptacle.

For removably mounting and supporting sifting drawer 54 within interior volume 44 of housing 14, an upper guide member 94, a lower guide member 98 and an inner guide member 100 are provided. Preferably, upper guide member 94, lower guide member 98 and inner guide member 100 will extend along most, if not the entire, length of sifting drawer 54 between front end 64 and back end 68 of sifting drawer 54. Upper guide member 94 and lower guide member 98 may be formed integrally with housing 14 and extend inwardly from the inner surface 102 of housing 14. Upper guide member 94 and lower guide member 98, respectively, include support surfaces 104 and 108. Support surfaces 104 and 108 are spaced apart to slidably receive sifting drawer 54. Inner guide member 100 may be a rod of any cross-sectional shape, including for example, a generally square, rectangular, or circular cross-sectional shape. Inner guide member 100 is secured in place by fasteners 106, such as screws or bolts, that extend through front end 38 and rear end 40 to engage a respective end 105 of inner guide member 100. Inner guide member 100 is spaced a distance from internal side 102 of housing 14 to allow a slidable fit for sifting drawer 54. Inner guide member 100 also maintains sifting drawer 54 positioned within upper guide member 94 and lower guide member 98. Preferably, inner guide member 100 contacts arc-shaped inner sidewall 62 to ensure arc-shaped outer sidewall 60 of sifting drawer 54 is in a relatively close relationship with internal side 102 of housing 14. This reduces the likelihood of litter 50 entering a space created between inner sidewall 62 and housing internal side 102, when the housing 14 is rotated for sifting soiled litter 50. As shown in FIG. 3 for example, when sifting drawer 54 is moved to the sealed closed position, the outer surfaces 107 of front end 64 cooperate with adjacent inner surfaces 109 in housing 14 that surround opening 52, to further support drawer 54.

Figure 8:
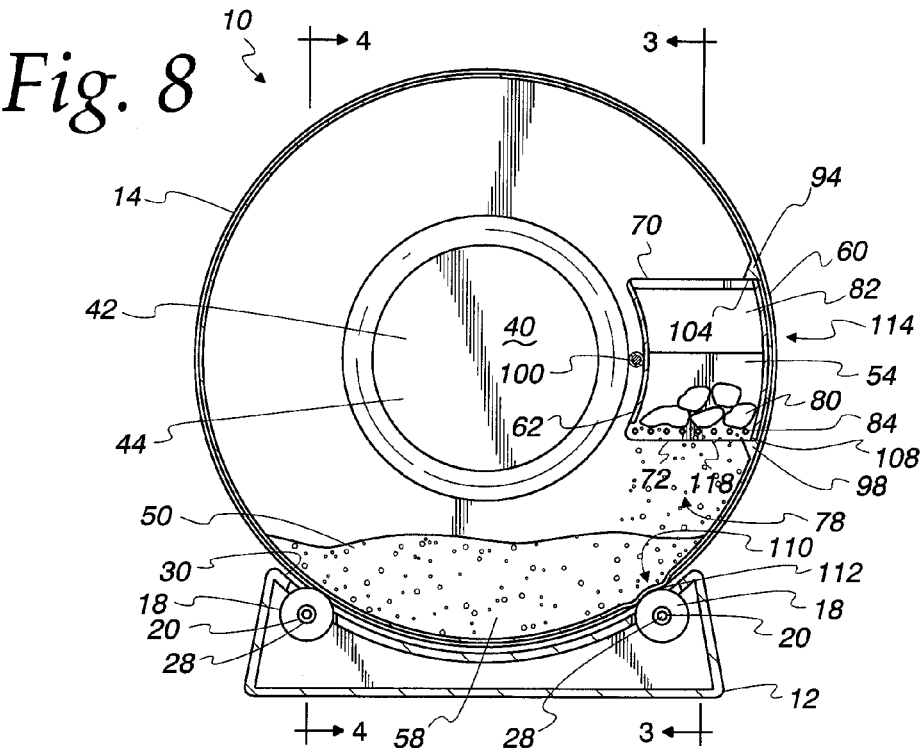
FIG. 8 is a side sectional view of the animal waste handling apparatus as shown in FIG. 7 with the housing rotated about 110 degrees counterclockwise from the position shown in FIG. 7.

As best seen in FIGS. 5 and 8, apparatus 10 may optionally include at least one stabilizer 110, for stabilizing housing 14 at a rest position 114 when a pet enters, exits and uses the apparatus 10. More specifically, to prevent rotation of housing 14 due to the rotational forces generated by a pet during its typical use of apparatus 10, an exemplary stabilizer 110 includes a recess 112 in circumferential groove 34. If optional groove 34 or 36 is not included, recess 112 can optionally be located in the surface of outer side 32. When at rest position 114, housing 14 has been rotated to a position where wheel 18 is positioned within recess 112. Thereafter, wheel 18 and recess 112 cooperate to resist and inhibit further rotation of housing 14. Recess 112 is formed to a depth and configuration whereby typical movements by a pet do not generate a rotational force equal to or greater than that required to cause housing 14 to rotate from the stabilized position at rest position 114. At least one stabilizer 110 may be provided for both circumferential grooves 34, 36 at a position for cooperation with a wheel 18 when the apparatus is in the resting position. In any event, stabilizers 110 are not configured so as to prevent convenient and easy rotation of housing 14 by a pet owner when required. One preferred rest position for apparatus 10, is shown in FIGS. 5 and 8 and indicated generally at 114. At rest position 114, sifting drawer 54 is at about a 3 o'clock position. Stated another way, at rest position 114 sifting drawer 54 has been rotated in a counterclockwise direction to a position that is about 90 degrees upward from its bottommost position during the 360 degree rotation of housing 14 about its longitudinal axis. At rest position 114, filter member 74 of sifting drawer 54 is generally horizontal and bottom side 118 of filter member 74 is generally facing downwardly.

Before beginning use, or when otherwise periodically required, apparatus 10 is supplied with a fresh batch of litter 50 in an amount that will be sufficient to cover bottom 58 of interior volume 44 of housing 14 to a sufficient depth, such depth for example is about 2 inches to about 4 inches, typically about 3 inches. Filling can be accomplished by standing an empty housing 14 upright, and then pouring a fresh supply of litter 50 into interior volume 44 through opening 42 and/or opening 52. In order to view the depth of litter 50, apparatus 10 may include an optional window 132 shown only in FIG. 13. Window 132 allows the pet owner to view the level of litter 50 when housing 14 is returned to a horizontal position. Window 132 preferably is located on front end 38. Optionally, all or a portion of front end 38 or back end 40 may be formed from a transparent or translucent material to allow viewing the level of litter 50. Once housing 14 has been filled with a supply of litter 50, housing 14 is placed on base 12 and preferably moved to rest position 114. At rest position 114, housing 14 is maintained in rest position 114 by optional stabilizer 110 and apparatus 10 is ready for use by a pet to enter through opening 42 and relieve itself in litter 50. Litter 50 that is used with apparatus 10 may be either non-clumping or clumping litter. When clumping litter is used, liquid animal waste that contacts litter 50 causes a clump of waste 80 to be formed.

FIGS. 5 to 8 illustrate the progression of sifting drawer 54 and housing 14 as it is rotated 360 degrees through a sifting cycle. FIG. 5 illustrates apparatus 10 at a point in time after one or more uses by a pet to relieve itself and a sifting cycle is necessary. Litter 50 has been soiled and now includes animal waste 80 mixed in litter 50. Animal waste 80 may be in the form of solid waste matter from the pet or clumps of waste formed when using clumping litter. A clump of waste 80 can be filtered by apparatus 10 in the same manner as solid waste 80. To separate and remove waste 80 from soiled litter 50, apparatus 10 is used to conduct a litter sifting cycle, such as illustrated in FIGS. 5-8. Typically, the litter sifting cycle will be started from a rest position such as the rest position 114 shown in FIG. 5. The litter sifting cycle is initiated by the pet owner causing rotational movement of housing 14. The direction of rotation being that direction indicated by indicia 48 (shown in FIGS. 1 and 2), and in this case a counterclockwise rotation. Typically, the pet owner places one or more hands on outer side 32 of housing 14 and pushes or pulls housing 14 in the indicated direction of rotation. Grips 116, such as depressions or ridges formed in outer side 32, may be provided to aid rotation by the pet owner. As can be seen in FIG. 6, the counterclockwise rotation of housing 14 from the position shown in FIG. 5, carries the mounted sifting drawer 54 to thereby rotate sifting drawer 54 in the same counterclockwise direction. The counterclockwise rotation causes sifting drawer 54 to rotate with open top side 70 as the leading side of sifting drawer 54, and bottom side 72 as the trailing side, as sifting drawer 54 is rotated toward engagement with soiled litter 50. As top side 70 of sifting drawer 54 becomes inverted during its rotation, sifting drawer guide members 94, 98, and 100 maintain sifting drawer 54 in place. When inverted, the weight of sifting drawer 54 is shifted from being borne by lower guide member 98 to upper guide member 94. Inner guide member 100 continues to hold and support sifting drawer 54 in place within upper guide member 94 and lower guide member 98. FIG. 7 illustrates sifting drawer 54 after it has been further rotated in a counterclockwise direction to a position where sifting drawer 54 begins to capture an amount of litter 50 that has been soiled with waste 80. Captured litter 50 enters sifting drawer 54 through open top side 70. Continued rotation of sifting drawer 54 forces litter 50 and waste 80 into interior 82 of sifting drawer 54. Thereafter, captured litter 50 is forced by the continued rotation to move towards the bottom 72 of sifting drawer 54 and filter member 74. Before passing through filter member 74, the captured soiled litter 50 is a mixture of reusable litter 50 and waste 80. During filtering, rods 84 of filter member 74 retain waste 80 within interior 82 of sifting drawer 54 by preventing most, if not all, of waste 80 from passing through filter member 74. The reusable portion of the soiled litter 50, however, is allowed to pass through open spaces 88 between rods 84, and out the bottom 72 of sifting drawer 54. During the sifting cycle, rotation of housing 14 is continued so that sifting drawer 54 is rotated entirely through all of litter 50 that is present at bottom 58 of interior volume 44. FIG. 8 shows the apparatus 10 having been rotated 360 degrees counterclockwise from the preferred starting point of the sifting cycle shown in FIG. 5. In FIG. 8, sifting drawer 54 has been rotated to a position above the normal level of litter 50. By conducting a sifting cycle in this manner, a supply of filtered litter 50 is available for further use by the pet. Filtered out waste 80 is retained in sifting drawer 54 and later discarded. It is noted that at the position shown in FIG. 8, apparatus 10 has been returned to rest position 114. When optional stabilizer 110 is provided, apparatus 10 is stabilized for the next use by a pet. It is also noted that the pet owner optionally may choose to rotate housing 14 around its longitudinal axis 16 more than once when conducting a sifting cycle. In any event, typically the sifting including the discarding of waste 80 from sifting drawer 54, is accomplished in less than about 30 seconds.

It is important to note that sifting drawer 54 preferably is configured to have an interior volume 82 that is without any obstructions, or at least without any substantial obstruction between top end 70 and bottom end 72. This allows at least substantially all of litter 50 that is captured into interior 82 through open top end 70 to thereafter flow without substantial obstruction to bottom end 72 of sifting drawer 54 and filter member 74. Thus, substantially all, if not all, of the potentially reusable litter 50 is not restricted or prevented from making passage to filter member 74. Consequently, reusable litter does not become trapped in interior 82 of sifting drawer 54.

It is also important to note that when housing 14 and sifting drawer 54 are returned to rest position 114, bottom 72 and filter member 74 are generally horizontal. This orientation allows continued filtering to take place by the force of gravity for any captured litter 50 still remaining in interior 82 of sifting drawer 54. This is especially advantageous when the pet owner has rapidly rotated housing 14 through the sifting cycle and not all of the captured litter has enough time to drain out through filter member 74. By providing a rest position, for example, rest position 114 where bottom 72 and filter member 74 are generally horizontal and generally facing downwardly, filtering of remaining captured litter 50 is continued. At rest position 114, the force of gravity continues to move captured litter 50 towards and out filter member 74. In FIG. 8, litter 50 that is continuing the filtering by the force of gravity after rotation of sifting drawer 54 has been stopped is indicated generally as litter 78. Such continued filtering can continue to take place even after the pet owner has left the area. In contrast, if the rest position was for example at a 12 o'clock position, captured litter could potentially remain in sifting drawer 54. Thus, potentially reusable litter 50 would be trapped in sifting drawer 54 and presently unavailable for continued use. Moreover, at the 12 o'clock position, captured and unfiltered litter 50 could later fall from sifting drawer 54 and directly onto a pet. This is especially likely when the pet's movement within housing 14 shakes captured and unfiltered litter 50 from a position within sifting drawer 54. If the rest position was at for example a 9 o'clock position, remaining captured and unfiltered litter 50 and waste 80 would later fall back to the bottom of housing 14.

Thus, a preferred rest position 114 of sifting drawer 54 is in a position where the bottom side 118 of filter member 74 and/or bottom 72 of sifting drawer 54 is facing generally downwardly, with the plane of filter member 74 and/or bottom 72 of sifting drawer 54 preferably positioned within a range of about 20 degrees above horizontal to about 20 degrees below horizontal position, more preferably within a range of about 10 degrees above horizontal to about 10 degrees below horizontal, and still more preferably within a range of about 5 degrees above horizontal or to about 5 degrees below horizontal. In such positions, litter 50 can continue to fall downwardly from within sifting drawer 54 by the force of gravity.

It is also noted that although rotation of housing 14 during the sifting cycle will typically be in a counterclockwise direction to cause top side 70 of sifting drawer 54 to be the leading side, housing 14 typically will also be capable of rotation in the opposite clockwise direction. Thus, as an optional additional procedure included in the sifting cycle, once reaching rest position 114, the pet owner may choose to alternately rotate housing 14 clockwise and counterclockwise, so as to move the plane of filter member 74 and/or bottom 72 of sifting drawer 54 within a range of about 20 degrees above horizontal to about 20 degrees below horizontal. Such action will tend to even out the level of litter 50 that has just been sifted as it lies at bottom 58 of interior volume 44 of housing 14. Also, during such back and forth rotation, litter 50 is free to continue to fall from sifting drawer 54 through filter member 74 due to gravitational forces. This back and forth motion also may act to cause housing 14 and attached sifting drawer 54 to vibrate as wheel 18 moves into and out of recess 112 when optional stabilizer 110 is provided. Such vibration, caused when wheel 18 enters and/or exits recess 112, urges captured litter 50 remaining in sifting drawer 54 to fall to, and to pass through, filter member 74. Such vibration action can occur when wheel 18 initially passes through recess 112 during the sifting cycle, or when repeatedly moved through recess 112 during the above-described back and forth rotation of housing 14, i.e. such as rotating sifting drawer 54 from rest position 114 within the previously discussed range of about 20 degrees above horizontal to about 20 degrees below horizontal.

Sometime after conducting a litter filtering cycle, waste 80 retained in sifting drawer 54 is discarded. To do so, sifting drawer 54 is removed through opening 52. Before fully removing sifting drawer 54 from housing 14, sifting drawer 54 may be axially slid back and forth along guide members 94, 98 and 100. This creates a shaking action that causes most, if not all, of the remaining reusable unsoiled litter 50 to fall downwardly toward filter member 74, through filter member 74, and downwardly away from bottom side 118 of filter member 74. Rest position 114, wherein filter member 74 is in a relatively horizontal position and facing downward, is also an advantageous position from which to conduct the back and forth shaking procedure for sifting drawer 54. This is because loosened remaining captured litter 50 can fall through filter member 74 by the force of gravity.

Periodically waste 80 is emptied from sifting drawer 54. To do so, drawer 54 is fully withdrawn from opening 52 and housing 14. Sifting drawer 54 is then tilted and/or fully inverted to dump retained waste 80 from sifting drawer 54 into, for example, a suitable bag or other waste receptacle. Back end 68 of sifting drawer 54 may include opening 92 to facilitate the dumping of waste 80 out from sifting drawer 54. Also, after litter 50 has been used for an extended certain period of time, litter 50 will no longer be suitable for further use. This requires a dumping of litter 50 from housing 14, and replacement with a fresh batch of litter 50. To dump litter 50 from housing 14, sifting drawer 54 is removed from sifting drawer opening 52 to thereby expose sifting drawer opening 52. Housing 14 is tilted so that front end 38 of housing 14 is generally facing downwardly. Litter can then be dumped through ingress and egress opening 42. More importantly, litter can also be dumped through sifting drawer opening 52. Since, as previously discussed, sifting drawer opening 52 is positioned adjacent to, or proximate periphery 46 of front end 38, an unobstructed free flowing exit passageway for of all litter 50 in interior volume 44 of housing 14 is provided. In contrast, if litter dumping is attempted through the centrally located ingress and egress opening 42, much of litter 50 would be blocked from exit by the closed portion of front end 38. Moreover, dumping through a centrally located ingress and egress opening 42 would typically require housing 14 to be fully vertically inverted. This could be awkward for the pet owner. In contrast, housing 14 can be gripped at front end 38 and rear end 40, and tilted to a lesser angle, for example 45 degrees, to conveniently dump litter 50 though sifting drawer opening 52. Sifting drawer opening 52, being smaller than ingress and egress opening 42, provides a more defined pour stream when pouring litter out from housing 14. This makes it easier to direct the stream into a waste receptacle without spilling.

It is also noted that apparatus 10 is relatively compact and has a relatively small foot print. Thus apparatus 10 can also be placed and used from a location under a counter, or other recessed location, where only access to the front end 38 is available. This is because sifting drawer opening 52 is located in front end 38, and sifting drawer 54 is removed and inserted into the housing 14 by sliding along a direction that is parallel to the longitudinal axis 16 of housing 14. This allows drawer 54 to be removed and inserted into housing 14 from front end 38 of housing 14 without having to remove apparatus 10 out into an open area. Housing 14 can also be rotated for a sifting cycle when access is only available for front end 38 of housing 14, such as by gripping handle 90. Also, housing 14 can be removed from base 12 from a location having limited access above housing 14.

Figure 10:
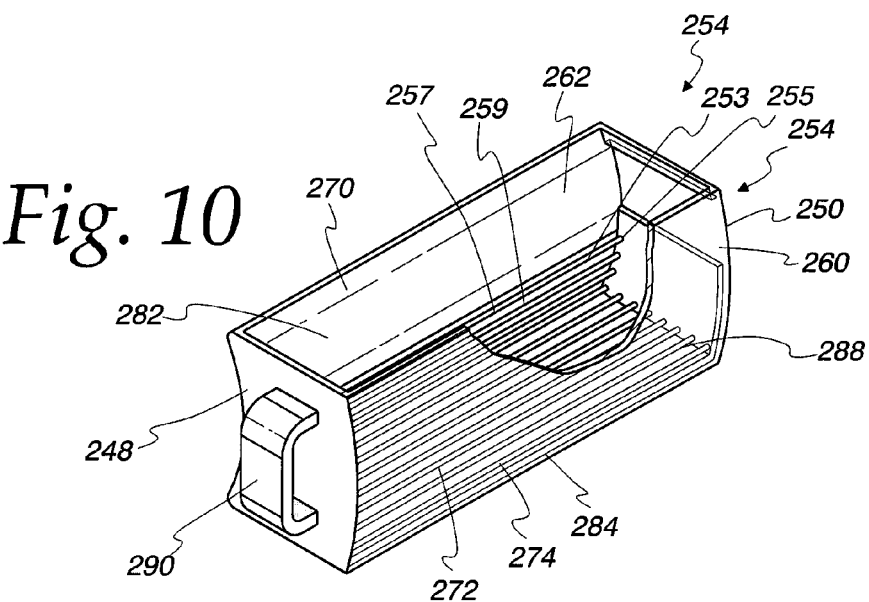
FIG. 10 is a perspective view illustrating a second embodiment of the sifting drawer in accordance with the present invention.

FIG. 10 illustrates a sifting drawer 254 that can be used in place of sifting drawer 54. Sifting drawer 254 functions and operates in a like manner to sifting drawer 54. Sifting drawer 254 is removably mounted through sifting drawer opening 52 in housing 14. Unlike sifting drawer 54, sifting drawer 254 has an inner sidewall 262 that also includes a filter member 253. Filter member 253 is located in a lower portion 255 of inner sidewall 262, or alternatively can be provided through all, or substantially all, portions of sidewall 262. Filter member 253, like filter member 74, may be any type of filter, as was previously described in a detailed discussion regarding filter member 74. Filter member 253 provides an additional cross sectional area that allows litter 50 within sifting drawer 254 to pass through and out filter member 253, while retaining waste 80 in the interior volume 282 of the sifting drawer 254. As illustrated in FIG. 10, filter member 253 includes spaced apart parallel rods 257 positioned to extend between front end 248 and back end 250 of sifting drawer 254. Openings 259 between parallel rods 257 provide a passageway for captured litter 50 to pass therethrough and exit interior 282 of sifting drawer 254, while waste 80 is retained within sifting drawer 254. Sifting drawer 254 also has an open top 270, an outer sidewall 260, and a handle 290. Sifting drawer 254 further includes a bottom 272, and a filter 274 in bottom 272. Filter 274, like filter member 74 of sifting drawer 54 forms the bottom 272 of sifting drawer 254, and includes parallel rods 284 and openings 288 therebetween. Filter 274, in similar manner to filter member 74 and filter member 253, allows litter 50 to pass through filter 274 while retaining waste 80 within interior volume 282 of sifting drawer 254. Interior volume 282, like interior 82 of sifting drawer 54, has an unobstructed volume to provide an unobstructed passage from open top 270 to filter 274 and in the case of sifting drawer 54, through interior 82 to filter member 74.

FIG. 12 illustrates another embodiment for a base 158 with an electric motor 160 for rotating housing 14 supported on base 158, rather than manually rotating housing 14 as previously described above. Any suitable arrangement for motorized rotation of housing 14 may be used. In the exemplary embodiment of base 158 illustrated, an electric motor 160 turns an axle 164 to cause wheels 166 to rotate. Rotating wheels 166 cause housing 14 to rotate through a sifting cycle. Motor 160 has a rotating shaft 168 and a belt 170 for transmitting power to axle 164 and thereby turn wheels 166. Exemplary motorized base 158 includes a power switch 172 for turning electric motor 160 on and off.

FIG. 13 illustrates another embodiment of the present invention. Apparatus 140 is substantially identical in function and operation to apparatus 10 except that apparatus 140 also includes window 132 and a dam section 142 in a housing 144. Housing 144 is otherwise identical to housing 14. Window 132 may be formed of a material that allows viewing therethrough, such as, for example, a clear plastic material. Window 132 is inserted into an opening 148 which is configured to receive window 132. Window 132 may be held in place by any suitable manner, such as, for example, by an interference fit with the inner surface 150 of opening 148. Window 132 allows viewing of the level of litter 50 that is held within the interior volume 152 of housing 144. Thus, the level of the litter can be viewed when housing 144 is in a horizontal position. Thus, the level of the litter can be viewed and accurately determined when housing 144 is in the horizontal position in which it is normally used. At least one gauge mark 154 may be provided on window 132, or on a surface 176 of housing 144 that is adjacent to window 132. Gauge mark 154 preferably is located at the level which is the preferred depth for litter held within interior volume 152 of housing 144, for example, a depth of about 3 inches. Preferably, the litter in interior volume 152 contacts the inside surface of window 132 so that an accurate indication of the depth relative to gauge mark 154 is possible. This is in contrast to otherwise having to view the level of litter at an angle, such as through pet entry opening 178. When viewed at such an angle only a rough estimate of the depth of the litter is possible. The front end 162 of housing 144 may also optionally include dam section 142 at pet opening 178. Dam section 142 adds an additional height to housing 144 to prevent litter from spilling out of interior volume 152, especially when housing 144 is rotated when conducting a sifting cycle. Housing 144 is rotated on a base 174 which is identical in function and operation to that of base 12 of apparatus 10.

It is noted that housing 14, base 12, sifting drawer 54 and sifting drawer 254 are all engineered to allow fabrication out of injection molded plastic. However, it is to be understood that other suitable material and means of production can be utilized.

While the invention has been described with respect to certain preferred embodiments, it is to be understood that the invention is capable of numerous changes, modifications, and rearrangements without departing from the scope or spirit of the invention as defined in the claims.

What is claimed is:

1. An apparatus for handling animal waste comprising:
   a cylindrical housing mounted for rotation and having two generally opposed ends and a generally circular side and an interior volume for holding litter, the cylindrical housing having an opening generally centrally located in one end of the cylindrical housing for allowing an animal to enter the interior volume of the cylindrical housing and relieve itself inside the housing,
   a second opening in one of the ends and located proximate the cylindrical side for insertion and removal of a sifting drawer into the interior volume of the cylindrical housing;
   a base for supporting the housing and allowing the housing to be rotated about an axis of the housing;
   the sifting drawer for sifting through the litter held in the apparatus to separate the litter from animal waste deposited in the litter and to retain the animal waste in the sifting drawer, the sifting drawer removably mounted adjacent an internal side of the cylindrical housing and having a volume contained within the interior of the housing so that the rotation of the housing about its longitudinal axis carries along the sifting drawer for sifting through a mixture of litter and animal waste, the sifting drawer having a first opening and a second opening spaced from the first opening, the second opening having a sifting member disposed therein, the housing being rotatable along its side in a first direction so that the first opening is the lead opening to be passed through a mixture to be sifted to allow the mixture to enter the sifting drawer and move to the second opening as the housing rotation continues in the first direction, the sifting member allows the litter in the mixture to pass through the sifting member and exit the sifting drawer and be contained in the housing while retaining solid animal waste of a particulate size larger than that which can pass through the sifting member in the sifting drawer; and
   at least one guide member within the interior of the housing for guiding and supporting the sifting drawer to allow the sifting drawer to be removably mounted in the interior of the housing and removed for discarding retained solid animal waste from the sifting drawer, the sifting drawer being inserted into and removed from the mounted position through the second opening in the housing by movement of the sifting drawer along a direction that is substantially parallel to the longitudinal axis around which the housing is rotated.

2. The apparatus of claim 1 wherein the opening for allowing an animal entry into the interior volume of the housing and the second opening for insertion and removal of the sifting drawer are both located in the same end of the housing.

3. The apparatus of claim 2 further comprising a first guide member located adjacent the internal side of the housing and a second guide member located adjacent the internal side of the housing, the first and second guide members spaced apart for receiving the sifting drawer and supporting the sifting drawer therebetween, and a third guide member spaced inwardly from the internal side of the housing for retaining the sifting drawer in a position between the first guide member and the second guide member; the sifting drawer having an unobstructed internal volume, the unobstructed volume allowing an unobstructed passage of the mixture from the first opening of the sifting drawer to the second opening of the sifting drawer.

4. The apparatus of claim 2 further comprising the sifting drawer having a substantially open top side and a bottom side, the first opening in the sifting drawer being the substantially open top side and substantially the entire bottom side of the sifting drawer is a filter member.

5. The apparatus of claim 4 further comprising the filter member includes a plurality of spaced apart rods positioned along the bottom side of the sifting drawer and a plurality of openings between the rods, the openings for allowing litter to pass therethrough, and the housing includes a window for viewing the level of the litter placed in the interior volume of the housing.

6. The apparatus of claim 4 further comprising the sifting drawer having an outer sidewall and an inner sidewall, the outer sidewall of the sifting drawer positioned adjacent to and extending along the internal side of the cylindrical housing when mounted in the interior volume of the housing, and the inner sidewall of the sifting drawer is in a position that is spaced from the internal side of the housing.

7. The apparatus of claim 6 further comprising the inner sidewall includes a filter member.

8. The apparatus of claim 4 further comprising the bottom side of the sifting drawer is positioned opposite to the top side of the sifting drawer, and the housing is rotated about the longitudinal axis of the housing to conduct a litter sifting cycle wherein the top side is the leading side to enter the litter held in the bottom of the housing and the bottom side is the trailing end when rotated through the litter, the sifting cycle including a rest position after sifting through the litter whereat the plane of the filter member of the sifting drawer is within at least about 20 degrees of horizontal to allow litter of the captured mixture to continue to fall downwardly out the filter member.

9. The apparatus of claim 8 further comprising at least one stabilizer to inhibit rotation when the housing is in the rest position, and when in the rest position the plane of the filter member is within about 5 degrees of horizontal.

10. An apparatus for handling animal waste comprising:
a cylindrical housing mounted for rotation and having two generally opposed ends and a generally circular side and an interior volume for holding litter, the cylindrical housing having an opening generally centrally located in one end of the cylindrical housing for allowing an animal to enter the interior volume of the cylindrical housing and relieve itself inside the housing,
a second opening in one of the ends and located proximate the cylindrical side for insertion and removal of a sifting drawer into the interior volume of the cylindrical housing;
a base for supporting the housing and allowing the housing to be rotated about an axis of the housing;
the sifting drawer for sifting through the litter held in the apparatus to separate the litter from animal waste deposited in the litter and to retain the animal waste in the sifting drawer, the sifting drawer removably mounted adjacent an internal side of the cylindrical housing and having a volume contained within the interior of the housing so that the rotation of the housing about its longitudinal axis carries along the sifting drawer for sifting through a mixture of litter and animal waste, the sifting drawer having a first opening and a second opening spaced from the first opening, the sifting drawer having an unobstructed internal volume, the unobstructed volume allowing an unobstructed passage of the mixture from the first opening of the sifting drawer to the second opening of the sifting drawer, the second opening having a sifting member disposed therein, the housing being rotatable along its side in a first direction so that the first opening is the lead opening to be passed through the mixture to be sifted to allow the mixture to enter the sifting drawer and move to the second opening as the housing rotation continues in the first direction, the filter member allows the litter in the mixture to pass through the sifting member and exit the sifting drawer and be contained in the housing while retaining solid animal waste of a particulate size larger than that which can pass through the sifting member in the sifting drawer; and
the sifting drawer being insertable into and removable from a removably mounted position through the second opening in the housing by movement of the sifting drawer along a direction that is substantially parallel to the longitudinal axis about which the housing is rotated.

11. The apparatus of claim 10 further comprising at least one guide member within the interior of the housing for guiding and supporting the sifting drawer to allow the sifting drawer to be removably mounted in the interior of the housing and removed for discarding retained solid animal waste from the sifting drawer.

12. The apparatus of claim 11 further comprising the second opening is located proximate to the periphery of one of the ends so that when the sifting drawer is removed from the housing the second opening may be used to dump litter from the housing, and the housing includes a window to allow viewing the level of litter in the housing.

13. The apparatus of claim 11 further comprising a window positioned in one of the ends of the housing for allowing the level of the litter in the interior volume to be viewed through the window.

14. The apparatus of claim 11 further comprising the second opening for insertion and removal of the sifting drawer is located in the end of the housing that includes the opening for allowing entry of the animal, and the second opening is located adjacent the periphery of the end in which the second end is located so that when the sifting drawer is removed from the housing the second opening provides an opening adjacent the periphery for dumping litter from the interior volume of the housing.

15. The apparatus of the claim 10 further comprising a stabilizer member for inhibiting rotation to maintain the housing in position when a pet enters, uses, and exits the housing.

16. The apparatus of claim 15 further comprising at least one wheel positioned on the base, a circumferential groove in the cylindrical side of the housing, and the wheel is positioned within the groove so that the wheel and groove cooperate to maintain the housing aligned on the base when rotating the housing.

17. The apparatus of claim 16 further comprising a rest position for the apparatus and the apparatus includes a stabilizer to inhibit rotation to maintain the housing in the rest position when a pet enters, uses, and exits the housing, and the stabilizer is a recess in the circumferential groove, and the wheel is positioned in the recess when the housing is in the rest position.

18. A method of handling pet waste comprising:
providing a rotatable cylindrical housing having a central axis, and an interior volume for holding litter and for allowing a pet to enter and relieve itself in the litter;
providing an ingress and egress opening in the housing for allowing a pet to enter the interior volume of the housing;
providing a sifting drawer for sifting a mixture of the litter and pet waste interspersed therein, to separate the pet waste from the litter, the sifting drawer including an interior volume, a substantially open top side and opposite bottom side including a filter member;
removably mounting the sifting drawer within the interior volume of the housing, the sifting drawer mounted to the housing so that rotation of the housing carries the sifting drawer, and the sifting drawer is mounted in a position so that when the housing is rotated in a first direction the open top side is the leading side of the sifting drawer to pass into and out of the litter;
rotating the housing and the sifting drawer in the first direction about the central axis of the cylindrical housing to cause the mixture to enter the interior volume of the sifting drawer through the open top side; thereafter
continuing the rotation of the housing in the first direction to cause the mixture captured in the interior volume of the sifting drawer to be moved towards the filter member in the bottom side of the sifting drawer;
filtering the captured mixture to separate the litter from the pet waste contained in the mixture by rotating the housing in the first direction to cause the captured litter to move to the filter, whereat the filter member allows litter to pass through the filter member and out the bottom of the sifting drawer and the filter member retains pet waste within the interior volume of the sifting drawer;

thereafter removing the sifting drawer from the housing by withdrawing the sifting drawer along a direction that is parallel to the axis about which the housing is rotated; and thereafter discarding waste retained in the interior of the sifting drawer.

19. The method of claim 18 further comprising;

stopping the rotation at a first position after passing through the mixture whereat the filter member is substantially horizontal to allow litter of the captured mixture to fall from the sifting drawer; and shaking the sifting drawer at the first position before fully removing the sifting drawer from the housing to discard the waste, the shaking including moving the sifting drawer back and forth along the direction that is parallel to the axis of rotation of the housing to thereby cause captured litter remaining in the sifting drawer to be filtered and fall through the filter member.

20. The method of claim 19 further comprising the interior volume of the sifting drawer is an unobstructed volume between the top side and the bottom side of the sifting drawer so that the mixture entering the top side has an unobstructed passage to the filter member.

\* \* \* \* \*